United States Patent [19]
Naaman

[11] Patent Number: 6,060,163
[45] Date of Patent: May 9, 2000

[54] OPTIMIZED GEOMETRIES OF FIBER REINFORCEMENT OF CEMENT, CERAMIC AND POLYMERIC BASED COMPOSITES

[75] Inventor: Antoine E. Naaman, Ann Arbor, Mich.

[73] Assignee: The Regents of The University of Michigan, Ann Arbor, Mich.

[21] Appl. No.: 09/382,841

[22] Filed: Aug. 25, 1999

Related U.S. Application Data

[62] Division of application No. 08/707,589, Sep. 5, 1996, Pat. No. 5,989,713.

[51] Int. Cl.$^7$ ........................................................ D02G 3/00
[52] U.S. Cl. ........................ 428/397; 428/358; 428/361; 428/364; 428/392; 428/394
[58] Field of Search ..................................... 428/397, 358, 428/361, 364, 392, 394

[56] References Cited

U.S. PATENT DOCUMENTS

| | | |
|---|---|---|
| 305,226 | 9/1884 | Ransome . |
| 3,650,785 | 3/1972 | Ball et al. . |
| 4,078,940 | 3/1978 | Marsden . |
| 4,461,855 | 7/1984 | Phillips . |

FOREIGN PATENT DOCUMENTS

| | | |
|---|---|---|
| 494723 | 7/1992 | European Pat. Off. . |
| 1282563 | 10/1960 | France . |
| 805177 | 5/1951 | Germany . |
| 1960319 | 12/1969 | Germany . |
| 2044249 | 9/1970 | Germany . |
| 4218450 | 9/1993 | Germany . |
| 150451 | 9/1920 | United Kingdom . |
| 1446855 | 8/1976 | United Kingdom . |
| 8001179 | 6/1980 | WIPO . |
| 8704208 | 7/1987 | WIPO . |

OTHER PUBLICATIONS

Ernest L. Ransome—Concrete Designer, Constructor, Inventor, M.K. Hurd, Concrete International, May 1996 pp. 50–51.

Handbook of Fillers and Reinforcements for Plastics, Harry S. Katz, pp. 604–609.

Primary Examiner—Richard Weisberger
Attorney, Agent, or Firm—Harness, Dickey & Pierce, P.L.C.

[57] ABSTRACT

Fibers, continuous or discontinuous, and bars having optimized geometries for use in the reinforcement of cement, ceramic and polymeric based matrices are claimed. The geometries are designed to increase the ratio of surface area available for bond between the fiber and the matrix to the cross-sectional area of fiber. In the case of a continuous reinforcement comprised of a single fiber or a bar made out of a bundle of fibers, such as is the case in reinforced and prestressed concrete, increasing the surface area available for bond leads to a decrease in crack width, development length, and transfer length. The fibers or bars are also configured to be amenable for twisting or to have spiral like deformations along their longitudinal axis to further develop the mechanical component of bond between the fibers and the matrix. Additional methods of mechanical bond enhancement, such as crimping and/or addition of anchorages, such as hooked ends, paddles, buttons, etc. . . . , can be applied to the claimed fibers to further improve their bond characteristics.

21 Claims, 6 Drawing Sheets

$\Sigma_o$ = FIBER PERIMETER
$A$ = FIBER CROSS SECTIONAL AREA
$\tau$ = AVERAGE BOND STRESS
$\sigma_t$ = TENSILE STRESS IN THE FIBER
$P$ = APPLIED PULL-OUT LOAD $P = \Sigma_o \tau L_e$
$\sigma_t = P/A = (\Sigma_o/A) \tau L_e$

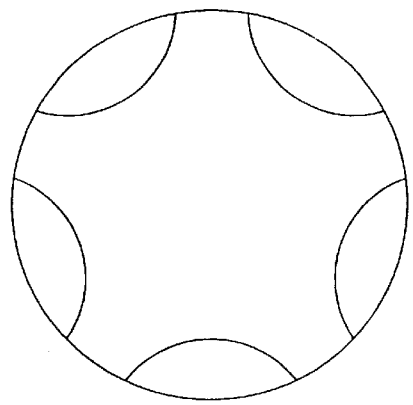
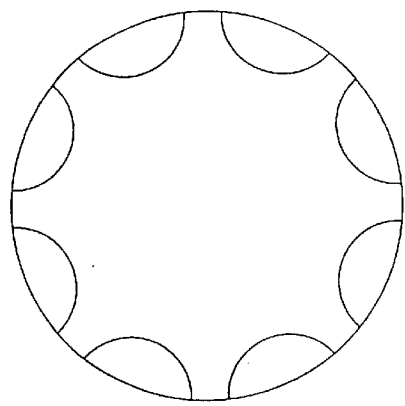
*Fig-5A*  *Fig-5B*
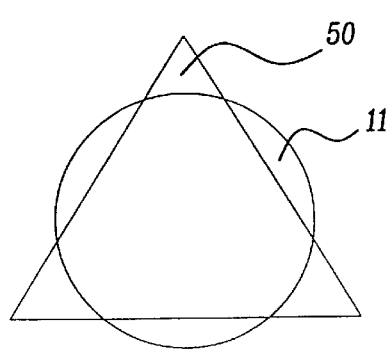
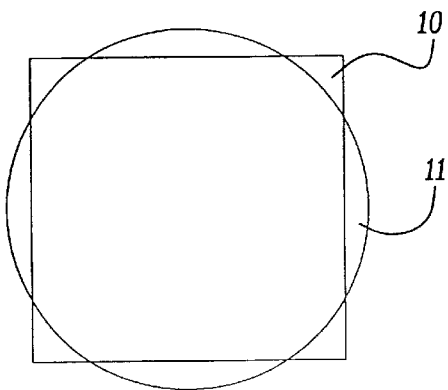
*Fig-6A*  *Fig-6B*
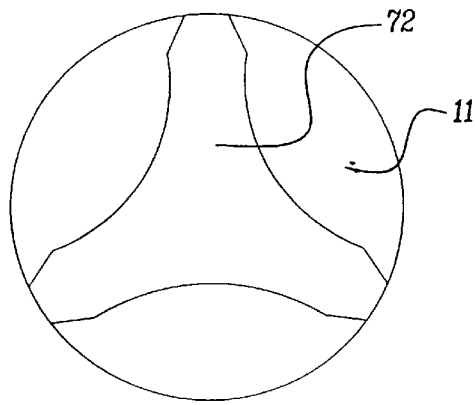
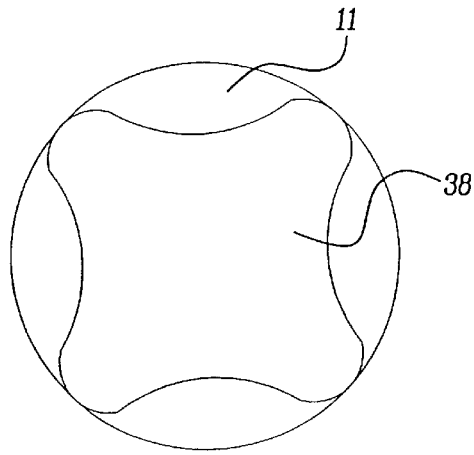
*Fig-7A*  *Fig-7B*

OPTIMIZED GEOMETRIES OF FIBER REINFORCEMENT OF CEMENT, CERAMIC AND POLYMERIC BASED COMPOSITES

This is is a division of U.S. patent application Ser. No. 08/707,589, filed Sep. 5, 1996, now U.S. Pat. No. 5,989,713.

BACKGROUND OF THE INVENTION

1. Field of the Invention

The present invention relates to continuous or discontinuous fibers or bars of optimized geometries for reinforcement of cement, ceramic, and polymeric based matrices. More specifically, the present invention relates to fibers of optimized geometries in which the ratio of lateral surface area available for bond per unit length of fiber to the cross-sectional area of the fiber, is larger than the corresponding ratio of a cylindrical fiber of same cross-sectional area.

2. Background Information

Cement and ceramic matrices are brittle in nature. They generally have a compressive strength much higher than their tensile strength. Thus, they tend to crack under tensile stresses. The addition of discontinuous fibers to the mixture has lead to improvements in numerous mechanical properties such as tensile and bending strength, energy absorption, toughness, etc.

Currently available fibers for cement based matrices can be classified according to the material of which they are made. Steel fibers can be found in different forms: round (cut from wire), flat (sheared from steel sheets), and irregularly shaped from melt. Their bond is generally enhanced by mechanical deformations such as crimping, adding hooks or paddles at their ends, or roughening their surface.

Glass and carbon fibers generally come in bundles or strands, each strand having a number of filaments. Polymeric fibers come in various forms including monofilament, fibrillated film network, bundles, twisted yams, braided strands as well as other forms. They may have a treated surface (etching or plasma treatment) to improve bond.

A continuous fiber or bar is defined as a fiber at least as long as the element or part of the element it is meant to reinforce; the term "continuous" may also refer to a fiber having a very high aspect ratio, defined as length over equivalent diameter. A bar can be made from a single fiber or a bundle of fibers. Of particular interest to this invention are fiber reinforced plastic (FRP) reinforcements in the form of bars for use in reinforced and prestressed concrete structures.

FRP reinforcements are essentially made from a bundle of strong stiff fibers embedded in a polymeric matrix such as an epoxy resin to form a bar-like reinforcing element. FRP reinforcements come in the form of bars, tendons, strands, and two or three dimensional meshes. FRP reinforcements utilizing high performance fibers such as carbon, glass, aramid (kevlar), and others, are seen primarily as a means to avoid corrosion problems otherwise encountered in concrete structures reinforced with conventional steel reinforcing bars or steel prestressing tendons. Their non-magnetic properties make them ideal for special applications such as radar stations and structures for magnetic levitation trains. Moreover, they can be beneficially used in structures subjected to certain chemicals and other harsh environments. However, one of the main drawbacks so far of FRP reinforcements has been their poor bond in comparison to conventional steel reinforcing bars or prestressing tendons.

As shown in FIG. 1, when a cementitous matrix reinforced with discontinuous fibers is subjected to a monotonic uniaxial load in tension, the following observations are generally made: 1) an initial almost linear response is observed (portion OA), followed by cracking; 2) the onset of cracking corresponds about to the deviation from linearity; 3) given the proper conditions (fiber and matrix reinforcing parameters) multiple cracking may occur (portion AB); 4) crack and damage localization follows stage 2 or 3; that is one main crack becomes critical and failure is imminent (point B); and 5) failure generally occurs by further opening of the critical crack (portion beyond B). When strong fibers are used, failure is generally characterized by fibers pulling out from the matrix. This implies that the bond between the fibers and the matrix essentially controls the maximum composite strength (point B of FIG. 1) that can be achieved. Furthermore, while it is desirable to utilize the strength of the fiber to the maximum extent possible, it is also desirable to allow the fibers to pull-out just before they break, in order to improve energy absorption and toughness. This bond failure is preferred, but at as high a value of stress as can possibly be achieved.

In current practice, where steel fibers are used with aspect ratios (length over diameter) of less than about 100, the average tensile stress induced in the fiber by bond at failure of the composite is only a fraction of the strength of the fiber. In analyzing the mechanics of fiber pull-out, the tensile stress in the fiber can be expressed in the following form:

$$\sigma_f = P/A = (\Sigma_o L_e \tau)/A \leq \sigma_{fu} \qquad (1)$$

where:
P=applied pull-out load
A=cross sectional area of the fiber
$\Sigma_o$=external perimeter of cross section of fiber
$L_e$=embedded length of fiber
$\tau$=average bond strength at the fiber-matrix interface
$\sigma_{fu}$=tensile strength of the fiber The above equation can be written in the following form:

$$\sigma_f = (\Sigma_o/A) L_e \tau \qquad (2)$$

It can be observed that, for a given embedment length, $L_e$, the fiber stress can be increased when either the bond strength, $\tau$, is increased, or the ratio ($\Sigma_o/A$) is increased, or both. For a round fiber of length L and diameter d, multiplying the ratio $\Sigma_o/A$ by L/4 leads to L/d which is commonly referred to as the aspect ratio of the fiber, and is an important parameter in the mechanics of composites reinforced with discontinuous fibers.

The tensile stress, $\sigma_f$(EQ. 2), can be increased by adding mechanical deformations to the fiber which increase the mechanical component of bond and thus improve the overall bond strength, $\tau$ In existing art, the mechanical component of bond is achieved, for example, by crimping or by providing hooks or paddles at the ends of the fibers. Crimping, while simple with metallic fibers, has the disadvantage of reducing the effective modulus of the fiber system; that is the effective modulus becomes smaller than the elastic modulus of the fiber material.

A very efficient method of improving the bond is by twisting the fiber. However, twisting is not always effective, such as: 1) twisting is not effective with round fibers, 2) twisting cannot be applied uniformly to fibers of irregular cross section, and 3) twisting leads to undesirable tunneling in fibers of flat cross-section; tunnel-like portions are difficult to penetrate by the matrix, leading to increased porosity, possible sites for stress concentration, and poorer interfacial zone between the fiber and the matrix. These effects tend to adversely affect the mechanical properties of the composite.

As shown above (EQ. 2), the tensile stress, $\sigma_f$, in the fiber can also be increased by optimizing the geometry of the fiber such as by maximizing the external fiber perimeter for a given fiber cross-sectional area, that is $\Sigma_o/A$. Geometrically a round fiber has a minimum value of $\Sigma_o/A$ when compared to other shapes of same cross section. Given a monofilament fiber material, one way to improve the ratio $\Sigma_o/A$ is, for instance, to use a thin flat fiber. A flat fiber is defined here as a fiber of rectangular cross-section with the larger side being at least twice the smaller side.

However, it has been observed that a flat fiber does not mix with the cement matrix as well as a round fiber. The compactness of the fiber section and its stiffness in all directions, seems to influence the rheology of the mix and the performance of the resulting composite. This implies that for mixing purposes, a compact cross-section is better than a flat one.

EQUATION 2 can be rewritten in the following form:

$$\sigma_f = (\Sigma_o 1/A) L_e/l \quad (3)$$

where l represents a unit length of fiber. Thus, the numerator of the ratio $(\Sigma_o 1/A)$ represents the lateral area of the fiber per unit length, and the denominator represents its cross sectional area. It will be called here the Fiber Intrinsic Efficiency Ratio (FIER). For given bond conditions, maximizing the FIER should lead to maximizing the stress in the fiber and thus the composite strength prior to fiber pull-out. Thus:

$$\text{FIER} = (\Sigma_o \times 1)/A \quad (4)$$

Accordingly, there is a need for an improved fiber for reinforcement of cement, ceramic, and polymeric based composites which provides a higher bond surface per unit cross-sectional area or per unit volume of fiber used. There is also a need for improved fibers for reinforcement of cement, ceramic, and polymeric based composites which can undergo mechanical deformations, particularly effective twisting along their longitudinal axis, to develop the mechanical component of bond and thus improve overall performance.

Finally, there is need for fibers of optimized geometry to improve the ascending portion of the pull-out load versus slip curve of the fiber, the maximum pull-out load of the fiber, the stress-strain response of the composite under various loadings, and the energy absorbing capacity of the composite.

For the case of continuous fibers or bars the optimized geometries developed in this invention allow for a higher lateral surface area for bond of a typical reinforcing bar, as well as possible twisting, or the execution of spiral-like deformations along the longitudinal axis of the bar, to improve the mechanical component of bond. These should lead to improvements in the composite wherever bond is important, such as in reducing average crack spacing, development length of bars in reinforced concrete, and transfer length of prestressed tendons. The increased lateral surface area of the new bar system developed makes it easier to grip the bar for tensioning in prestressed concrete applications.

SUMMARY OF THE INVENTION

The present invention provides continuous or discontinuous fibers or bars (made either from a single fiber or a bundle of fibers), generally defined here as fibers, of optimized geometries for reinforcement of cement, ceramic, and polymeric based matrices.

One object of the present invention is to provide improved fibers for reinforcement of cement, ceramic and polymeric based composites which provide a higher bond surface per unit cross-sectional area or per unit volume of fiber used.

Another object of the present invention is to provide improved fibers for reinforcement of cement, ceramic, and polymeric based composites which can undergo effective twisting along their longitudinal axis, without forming tunneling, to develop the mechanical component of bond and thus improve overall performance.

It is a further object of the present invention to provide improved discontinuous fibers (plain or twisted) having anchorages at their ends, such as hooks or paddles or buttons, to further improve bond and the overall performance of composites.

It is still a further object of the present invention to provide improved discontinuous fibers (plain or twisted) crimped along their length to further improve bond and the overall performance of composites.

In order to achieve the foregoing objects, the present invention provides fibers having optimized cross-sections and longitudinal shapes. The fibers are generally polygonal, having for instance primarily triangular or primarily square cross-sections instead of normal circular fibers or flat fibers. The optimized cross-sections of the present invention provide a lateral surface area for bond higher than that of a circular fiber per unit cross-sectional area or per unit volume of fiber. This leads to improved composite performance. Performance improvements with discontinuous fibers include greater strength, toughness, energy absorption, and strain capacity. Performance improvements with continuous fibers include smaller crack spacing, smaller development length, smaller transfer length, and more effective gripping during tensioning operations.

The fibers of the present invention having optimized polygonal cross-sections also can undergo effective twisting along their longitudinal axis to develop the mechanical component of bond and thus improve overall performance. Twisting will not work properly with circular fibers and will lead to tunneling in flat fibers leading to poor penetration by the matrix and potential pores and weak points. On the other hand, twisting is very effective with fibers of polygonal cross-section such as triangular or square sections. Because of the efficient geometry of the fiber sections of the present invention, and because of the effective twisting (without tunneling), the matrix around the fiber can provide a denser (or less porous) transition zone, thus better bond and enhanced properties. While applications of the new fibers can be in all matrices, the primary applications of the new discontinuous fibers are in reinforcing cement and ceramic based matrices in which the bond between the fiber and the matrix is generally weak leading to fiber pull-out instead of fiber failure at maximum strength of the composite. The primary applications of the new continuous fibers are in the use of fiber reinforced plastic (FRP) bars in reinforced and prestressed concrete structures.

Twisting as implied here can be applied in one direction only or simultaneously in alternate directions. Twisting can also be simulated by scoring the surface or inscribing grooves in a spiral form, or by scoring the surface or inscribing grooves by alternate back and forth rotations along the surface, or by forming spiral grooves along the surface, during or after manufacturing.

The discontinuous fibers of the present invention having optimized polygonal cross-sections can undergo, in addition to twisting, other mechanical deformations such as crimping or hooked ends, to further develop the mechanical component of bond and thus improve overall performance.

Further objects, features and advantages of the invention will become apparent from a consideration of the following description and the appended claims when taken in connection with the accompanying drawings.

BRIEF DESCRIPTION OF THE DRAWINGS

FIGS. 5A–5B are cross-sectional views of fibers having polygonal or substantially polygonal optimized cross-sections according to the present invention;

FIGS. 6A and 6B are cross-sectional diagrams comparing the cross-sections of a triangular fiber to a circular fiber and a square fiber to a circular fiber having equivalent cross-sectional areas, respectively;

FIGS. 7A and 7B are cross-sectional diagrams comparing the cross-sections of a substantially triangular fiber to a circular fiber and a substantially square fiber to a circular fiber having equivalent perimeters, respectively;

DETAILED DESCRIPTION OF THE PREFERRED EMBODIMENT

Preferred embodiments of the optimized geometries of discontinuous fibers for reinforcement of cement, ceramic and polymeric based composites are described here below with reference to the drawings.

Based on the observation that the bond at the interface between a discontinuous fiber and a matrix is the weak link that governs the mechanical properties of the composite, it is essential that the pull-out load per fiber, due to bond, be maximized. One way to increase the pull-out load is by providing a more efficient fiber cross-section. However, it is important to keep the fibers compact in cross-section because fibers having compact cross-sections are stiffer than flat fibers and can be more easily mixed with the matrix. Generally, fibers having a flat cross-section are harder to mix than fibers having a compact cross-section.

Figure 3A:
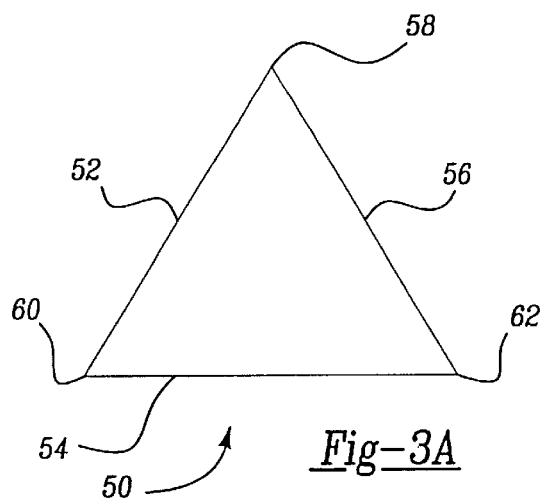
FIGS. 3A–3C are cross-sectional views of fibers having triangular or substantially triangular optimized cross-sections according to the present invention.
Figure 3B:
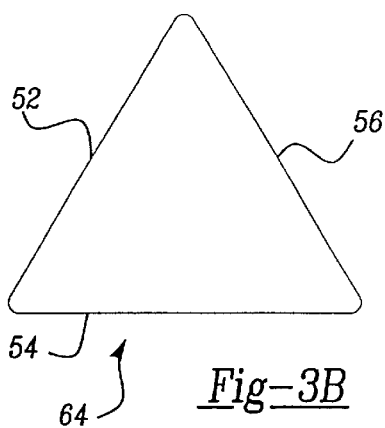
Figure 3C:
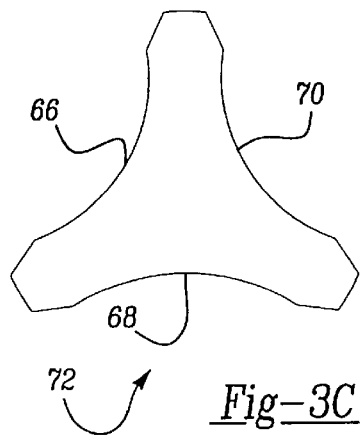
Figure 4A:
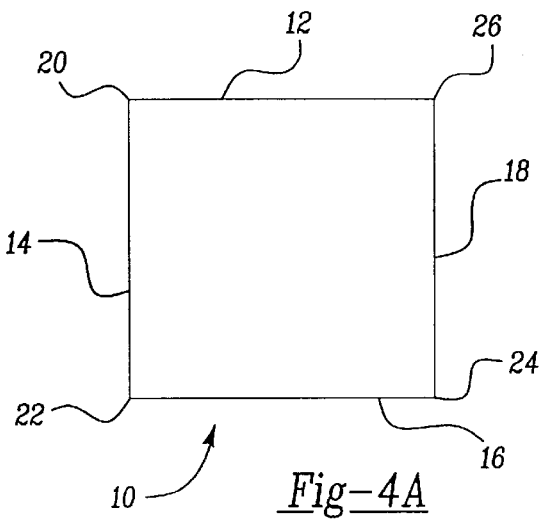
FIGS. 4A–4C are cross-sectional views of fibers having square or substantially square optimized cross-sections according to the present invention.
Figure 4B:
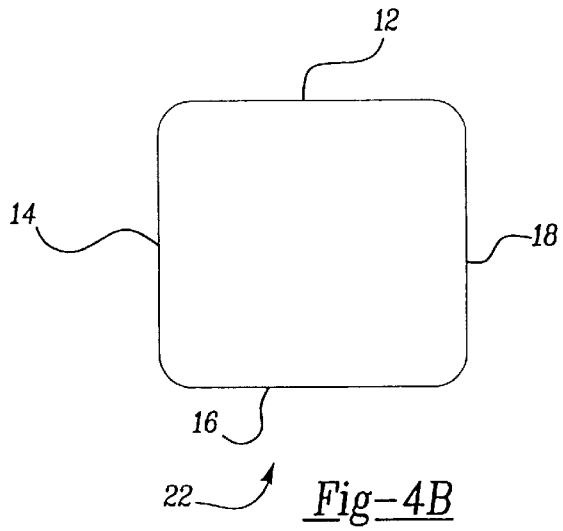
Figure 4C:
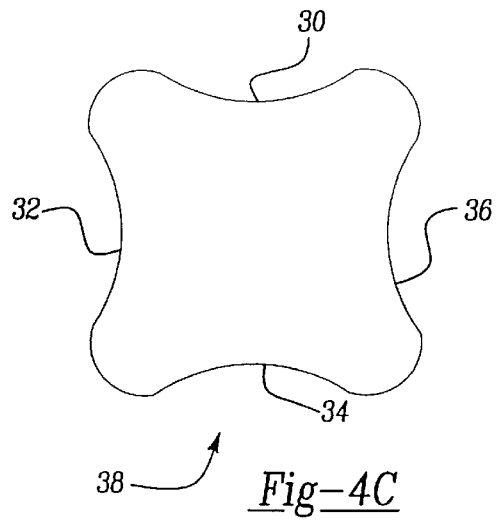

FIGS. 3–5 show cross-sectional views of several optimized geometries of discontinuous fibers. The substantially triangular fibers, shown in FIGS. 3A–3C, the substantially square fibers, shown in FIGS. 4A–4C, and the substantially polygonal fibers shown in FIGS. 5A and 5B, provide an increased Fiber Intrinsic Efficiency Ratio when compared with prior art circular fibers having the same cross-sectional area or volume. Furthermore, unlike prior art circular and flat fibers, the substantially polygonal fibers of the present invention can be effectively twisted to increase the mechanical component of bond.

FIG. 3A shows the cross-section of an equilateral triangular fiber, indicated generally at 50, according to the present invention. Triangular fiber 50 has three sides, 52, 54, and 56 and three corners 58, 60, and 62. The corners 58, 60, and 62 of triangular fiber 50 can be rounded for convenience or ease of production, to produce the substantially triangular cross-sectional fiber of FIG. 3B, indicated generally at 64. The perimeter or lateral surface to cross-sectional area of substantially triangular fiber 64 can further be increased by removing concave sections 66, 68 and 70 from sides 52, 54 and 56 to produce the optimized substantially triangular fiber shown in FIG. 3C, indicated generally at 72. In the preferred embodiment, the concave sections 66, 68 and 70 are curved (circular or elliptical), however, alternative shapes are contemplated. For a perfectly circular fiber section of diameter d and cross-sectional area A:

$$FIER=(\Sigma_o \times 1)/A=2\pi(d/2)/\pi(d/2)^2=4/d$$

In the case of an equilateral triangular fiber section of side c (FIG. 6A):

$$FIER=(\Sigma_o \times 1)/A=(3c/0.433c^2)=6.93/c$$

For an equilateral triangular fiber of the same cross-sectional area as the circular fiber $\pi(d/2)^2=0.433c^2$, or $c=1.35d$. Thus we have:

$$(FIER_{triangle}/FIER_{circle})=(6.93/1.35d)/(4/d)=1.28$$

Therefore, by using an equilateral triangular fiber 50 having the same cross-sectional area (or weight or volume) as a circular fiber 11, we can increase the surface area for bond by 28%, as shown in FIG. 6A. This implies also that the average fiber stress at pull-out (EQ. 1) and the related strength of the composite increase. Reciprocally, for the same composite strength and mechanical performance, a material savings can be achieved by using triangular fibers 50 instead of circular ones 11. Similar conclusions can be reached for substantially triangular fibers and optimized substantially triangular fibers such as shown in FIGS. 3B and 3C, respectively. The optimized substantially triangular fiber of FIG. 3C could lead to even higher savings than the triangular fiber of FIG. 3A. It can be shown, for instance, that the substantially triangular fiber of FIG. 3C has an intrinsic fiber efficiency ratio exceeding twice that of the circumscribing circular fiber. This implies a material savings of at least 50% in comparison to circular fibers.

Figure 10A:
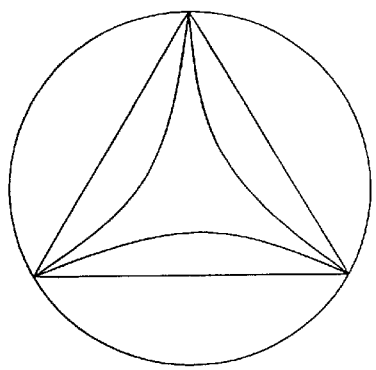
FIGS. 10A and 10B are cross sectional diagrams of an ideal substantially triangular fiber, and an actual substantially triangular fiber illustrating the savings in section that can be achieved with respect to the circumscribing circular section.
Figure 10B:
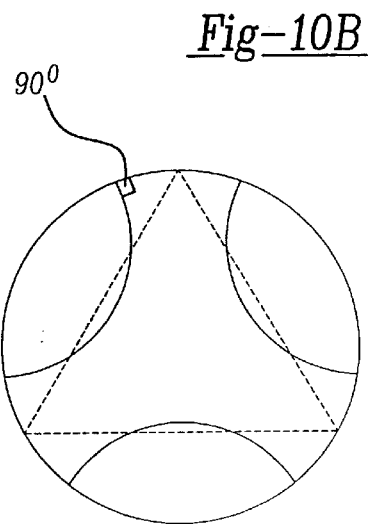

FIGS. 10A and 10B illustrate ideal and actual sections of substantially triangular shape. The ideal section of FIG. 10A has a fiber intrinsic efficiency ratio 4.87 times that of the circumscribing circular fiber. This implies that for the same pull-out load, the cross-section of the ideal substantially triangular fiber shown in FIG. 10A can be only 21% that of the circumscribing round fiber. The actual example section of FIG. 10B has a fiber intrinsic efficiency ratio 2.13 times that of the circumscribing circular fiber. This implies that for the same pull-out load, the cross-section of the actual substantially triangular fiber of FIG. 10B can be only 47% that of the circumscribing round fiber. This leads to a real savings of more than 50% in the volume fraction of fibers used in the composite.

FIG. 4A shows the cross-section of a square fiber, indicated generally at 10, according to the present invention. Square fiber 10 has four sides, 12, 14, 16, and 18 and four corners 20, 22, 24 and 26. The corners 20, 22, 24 and 26 of square fiber 10 can be rounded for convenience or ease of production to produce the substantially square fiber of FIG. 4B, indicated generally at 28. The perimeter to cross-sectional surface area of square fiber 10 or substantially square fiber 28 can be significantly increased by removing concave sections 30, 32, 34 and 36 from sides 12, 14, 16 and 18 to produce the optimized substantially square fiber shown in FIG. 4C, indicated generally at 38. In the preferred embodiment, sections 30, 32, 34 and 36 are made concave, such as circular or elliptical, however, alternative shapes are contemplated.

Let us consider for instance the case of a square fiber. For a perfectly square fiber section of side $\alpha$ and cross-sectional area A:

$$FIER=(\Sigma_o \times 1)/A=4a/a^2=4/a$$

For a square fiber of the same cross-sectional area as the circular fiber $\pi(d/2)^2=\alpha^2$, or $\alpha=0.88d$. Thus we have:

$$(FIER_{square}/FIER_{circle})=(4/0.88d)/(4/d)=1.13.$$

Therefore, by using square fiber 10 of same total cross-sectional area (or weight, or volume) as circular fiber 11, we increase the surface area for bond by 13% as shown in FIGS. 4A and 6B. This implies that the average fiber stress at pull-out and the related strength of the composite increase. Reciprocally, for the same composite strength and mechanical performance, a material savings can be achieved by using square fibers 10 instead of circular ones 11. Similar conclusions can be reached for substantially square fibers and optimized substantially square fibers such as shown in FIGS. 4B and 4C, respectively.

Figure 11A:
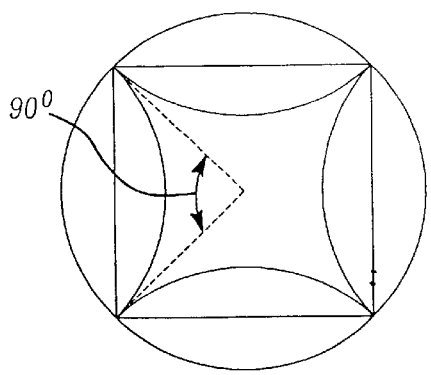
FIGS. 11A and 11B are cross-sectional diagrams of an ideal substantially square fiber, and an actual substantially square fiber illustrating the savings in section that can be achieved with respect to the circumscribing circular section.
Figure 11B:
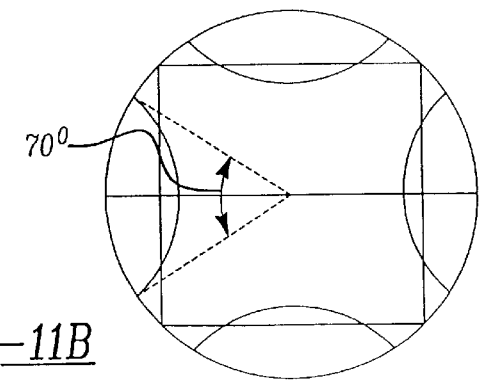

FIGS. 11A and 11B illustrate ideal and actual sections of substantially square shape. The ideal section of FIG. 11A has a fiber intrinsic efficiency ratio 3.66 times that of the circumscribing circular fiber. This implies that for the same fiber perimeter and pull-out load, the cross-section of the ideal substantially square fiber of FIG. 11A can be only 28% that of the circumscribing round fiber. The actual example section of FIG. 11B has a fiber intrinsic efficiency ratio 1.62 times that of the circumscribing circular fiber. This implies that for the same pull-out load, the cross-section of the actual substantially square fiber of FIG. 11B can be only 62% that of the circumscribing round fiber. This leads to a real savings of about 38% in the volume fraction of fibers used in the composite.

FIG. 7A illustrates qualitatively the material savings accomplished using optimized substantially triangular fiber 72 having the same perimeter as a circular fiber 11. Since the perimeters of the two fibers 72 and 11 are about the same, there is no loss in the performance characteristics, however, there is a substantial savings in material used (equal to the area between the two perimeters) making optimized substantially triangular fiber 72 much more efficient than circular fiber 11.

FIG. 7B illustrates qualitatively the material savings accomplished using optimized substantially square fiber 38 having about the same perimeter as circular fiber 11. Since the perimeters of the two fibers 38 and 11 are about the same, there is no loss in the performance characteristics, however, there is a substantial savings in material used (equal to the area between the two perimeters) making optimized substantially square fiber 38 much more efficient than circular fiber 11.

Figure 1:
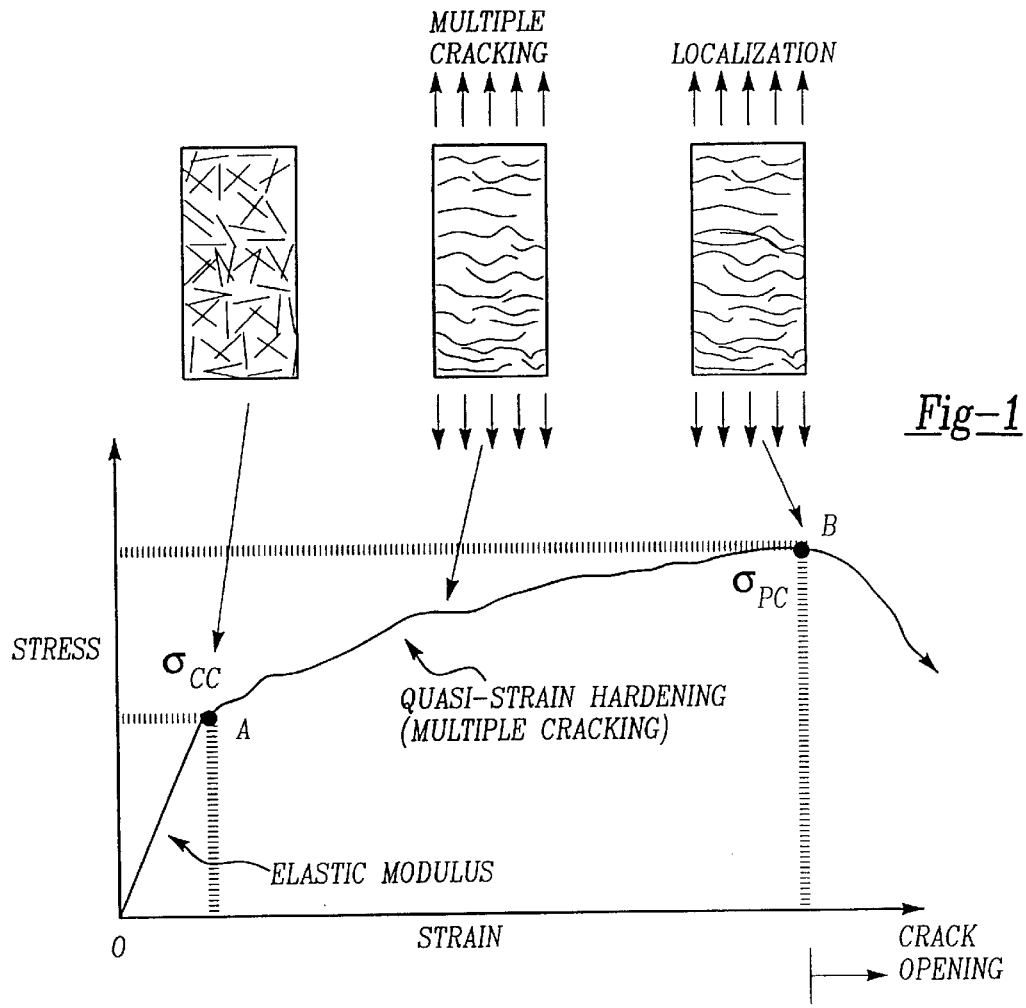
FIG. 1 is a diagrammatical representation of the stress elongation response of a prior-art high-performance fiber reinforced cement composite for which the maximum post-cracking strength is larger than the cracking strength.
Figure 2:
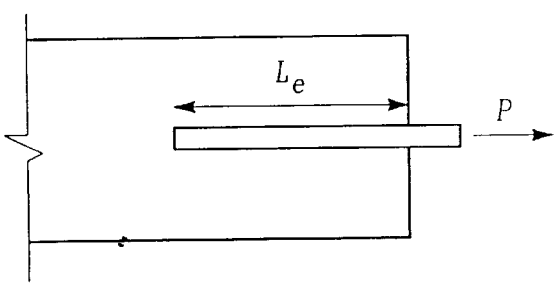
FIG. 2 is a schematic representation of the mechanical model for fiber pull-out from a matrix.

The material savings mentioned above not only translate into cost savings but also produce enhanced performance. Premixing discontinuous fibers with concrete in amounts larger than about 2% to 3% by volume is generally difficult as it leads to possible balling, segregation and a very harsh mix. Because the new fibers are much more efficient than currently used fibers, less of them are needed to achieve a prescribed level of composite performance. This allows easier mixing especially when a high amount of fibers is prescribed. Similarly, with fiber contents of 2% to 3%, high performance cement composites can be easily developed; high performance implies a stress-strain response in tension with multiple cracking and quasi-strain hardening behavior as suggested in FIG. 1.

It is contemplated that, the polygon-like sections shown in FIGS. 3 and 4 can also be extended to polygonal and substantially polygonal sections with many sides such as shown in FIGS. 5A and 5B. In all cases, the perimeter of the bond surface area can be of the same order as or larger than that of the circumscribing circular fiber, but the cross-sectional area is smaller leading to savings in materials and improved performance. In all cases, the fiber intrinsic efficiency ratio of the substantially polygonal section is larger than that of the circumscribing circular section and can be optimized for various conditions.

The triangular and substantially triangular and square and substantially square fibers of FIGS. 3 and 4, as well as other polygonal sections such as shown in FIGS. 5, 10, and 11 are relatively compact in cross-section. Therefore, discontinuous fibers having the illustrated cross-sections mix well into a matrix as well as provide added strength and efficiency advantages. The square and triangular fibers shown are relatively easy to fabricate, adding further manufacturing advantages.

Figure 8A:
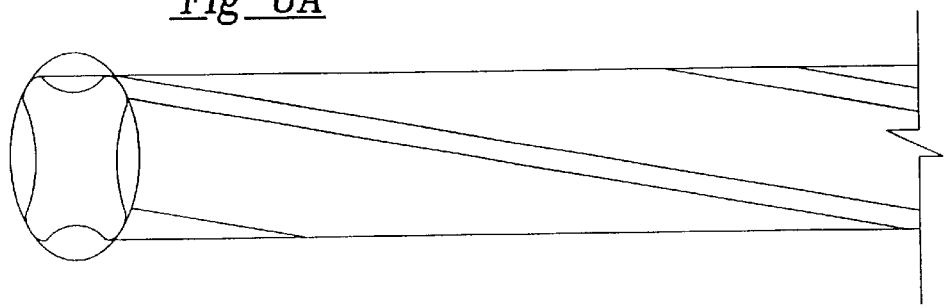
FIG. 8A is a schematic view of a twisted substantially square fiber, illustrating the mechanical deformation of the fiber.
Figure 8B:
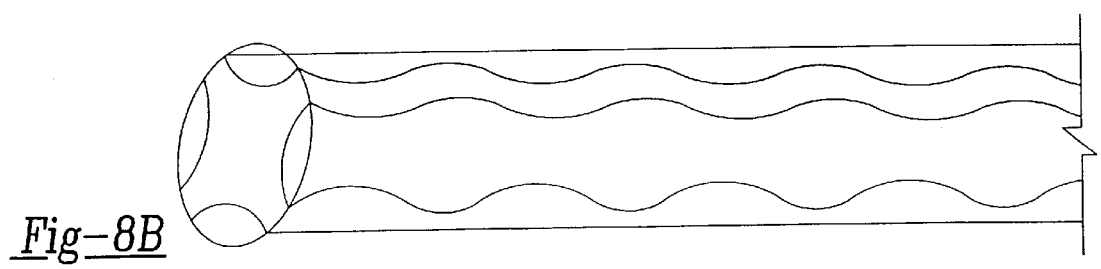
FIG. 8B is a schematic view of a substantially square fiber with alternate spiral like deformations illustrating how twisting can also be simulated during fabrication of the fiber.
Figure 9A:
FIGS. 9A–9D are schematic side views of a discontinuous fiber, plain or twisted, having hooked ends, paddle or conical ends, button ends, and enlarged ends, respectively.
Figure 9B:
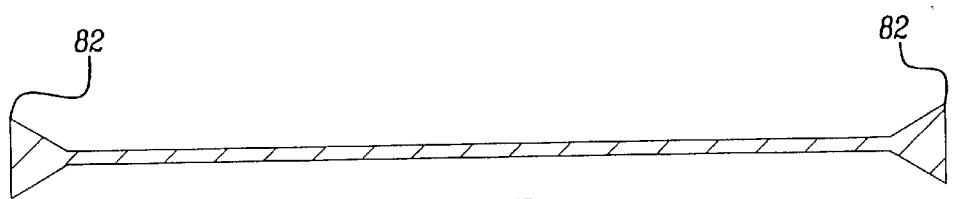
Figure 9C:
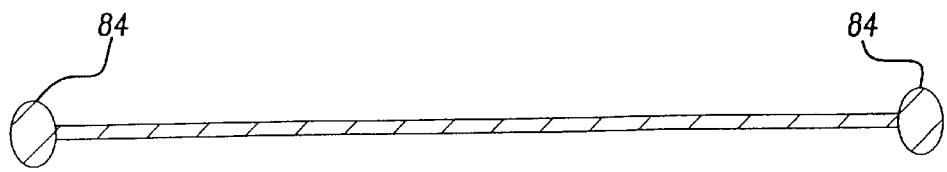
Figure 9D:
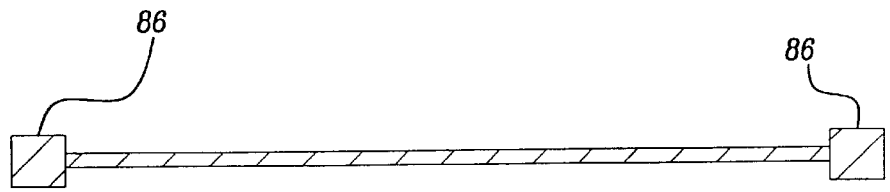

The fiber stress and the corresponding stress in the composite can also be increased by improving the mechanical component of bond of the fiber. The mechanical component of bond is increased by forming mechanical deformities in the fiber. Such mechanical deformities can include twisting (as defined earlier) the fiber along its longitudinal axis, as shown in FIGS. 8A and 8B. The optimized cross-sectional geometries of the present invention also present advantages over the prior art circular and flat fibers, in that they can be effectively twisted. Circular fibers do not lead to improved surface deformation upon twisting. Flat fibers, when twisted would form tunnel-like segments that trap air. These tunnel-like segments may not be penetrated by the matrix and may represent crack initiation points. Polygonal or substantially polygonal sections are easily amenable to twisting leading to mechanical surface deformations very effective in improving bond.

The optimized cross-sectional geometries of the present invention also present advantages regarding the mechanical component of bond in that, in addition to twisting, they can undergo mechanical deformations similar to those used in prior art, such as by crimping or addition of various anchorages. As shown in FIGS. 9A–9D, the anchorages can include, among other things, hooked ends 80, FIG. 9A, paddle ends 82, FIG. 9B, button ends 84, FIG. 9C or enlarged ends 86, FIG. 9D. These mechanical deformations, when deemed needed, help improve overall performance.

Figure 12A:
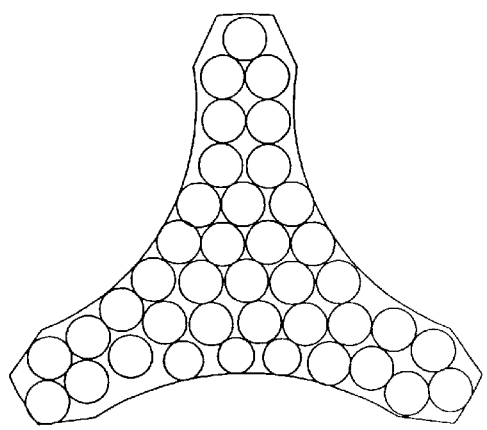
FIGS. 12A, and 12B are cross-sectional diagrams of typical fibers or bars, continuous or discontinuous, made from a bundle of smaller diameter fibers and designed according to the present invention.
Figure 12B:
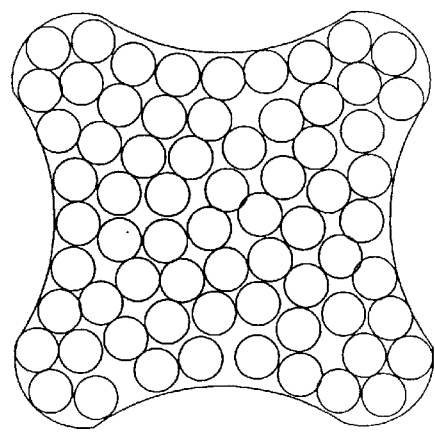
Figure 12C:
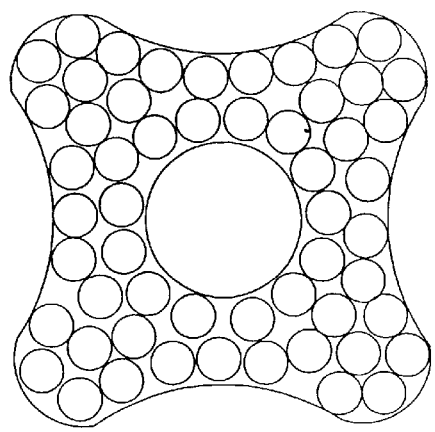
FIG. 12C is a cross-sectional diagram of a hollow-core fiber or bar, illustrating further improvement of the ratio of lateral surface for bond to the cross-sectional area of the fiber.

A continuous fiber or bar may be made of a single filament or a bundle of them. FIGS. 12A to 12C illustrate preferred cross-sections of continuous bars made with a bundle of filament fibers. The individual fibers may be circular or of optimized shape according to this invention. The statements made in prior sections related to the shape and geometry of the preferred embodiments apply to continuous as well as discontinuous fibers and bars; issues related to mixing, fiber pull-out, and end-anchorages do not apply to continuous fibers. For instance, the continuous bar of FIG. 12A has a ratio of lateral surface to cross-section more than twice that of the circumscribing circular bar. Thus, its development length when used in reinforced concrete, or its transfer length when used in prestressed concrete is expected to be less than 50% of that of the circumscribing circular bar. Using a similar reasoning related to bond forces, it is expected that the bar of FIG. 12A will produce about half average crack spacing than the circumscribing circular bar. Further improvement can also be achieved by using hollow-core bars, such as illustrated in FIG. 12C, in which the cross-sectional area is reduced leading to a higher fiber intrinsic efficiency ratio.

It is to be understood that this invention is not limited to the exact construction illustrated and described above, but that various changes and modifications may be made without departing from the spirit and scope of the invention as defined in the following claims.

I claim:

1. A composite structure comprising:
    a matrix material; and
    a fiber having a polygonal cross-section with surface faces wherein at least two adjacent surface faces intersect at an angle other than a 90 degree angle, said polygonal fiber having a fiber intrinsic efficiency ratio greater than that of a cylindrical fiber having the same cross sectional area as said polygonal fiber, the fiber intrinsic efficiency ratio being the ratio of the lateral surface area of a particular fiber per unit length relative to the cross sectional area of that particular fiber.

2. The composite structure of claim 1 wherein said fiber has three outside surface faces.

3. The composite structure of claim 1 wherein said fiber has a longitudinal axis, and said fiber is twisted along said longitudinal axis.

4. The composite structure of claim 1 wherein said fiber has a longitudinal axis, and said fiber is mechanically deformed along said longitudinal axis.

5. The composite structure of claim 1 wherein said fiber has a first end and a second end displaced along a longitudinal axis of said fiber, and one of said first end and said second end is a discontinuous cross sectional shape relative to a remainder of said fiber.

6. The composite structure of claim 5 wherein said one of said first end and second end is mechanically deformed to provide said discontinuous cross sectional shape.

7. The composite structure of claim 1 wherein said fiber is comprised of a plurality of filament fibers.

8. The composite structure of claim 7 wherein said fiber has a longitudinal axis, and said fiber is twisted along said longitudinal axis.

9. The composite structure of claim 1 wherein said matrix material is cement based.

10. The composite structure of claim 1 wherein said matrix material is ceramic based.

11. The composite structure of claim 1 wherein said matrix material is polymeric based.

12. A composite structure comprising:
    a matrix material; and
    a substantially triangular fiber having three outside surface faces, said triangular fiber having a fiber intrinsic efficiency ratio greater than that of a cylindrical fiber having the same cross sectional area as said polygonal cross-section fiber, the fiber intrinsic efficiency ratio being the ratio of the lateral surface area of a particular fiber per unit length relative to the cross sectional area of that particular fiber.

13. The composite structure of claim 12 wherein said triangular fiber has a longitudinal axis, and said triangular fiber is twisted along said longitudinal axis.

14. The composite structure of claim 12 wherein said triangular fiber has a longitudinal axis, and said triangular fiber is mechanically deformed along said longitudinal axis.

15. The composite structure of claim 12 wherein said triangular fiber has a first end and a second end displaced along a longitudinal axis of said triangular fiber, and one of said first end and said second end is a discontinuous cross sectional shape relative to a remainder of said triangular fiber.

16. The composite structure of claim 15 wherein said one of said first end and second end is mechanically deformed to provide said discontinuous cross sectional shape.

17. The composite structure of claim 12 wherein said triangular fiber is comprised of a plurality of filament fibers.

18. The composite structure of claim 17 wherein said triangular fiber has a longitudinal axis, and said triangular fiber is twisted along said longitudinal axis.

19. The composite structure of claim 12 wherein said matrix material is cement based.

20. The composite structure of claim 12 wherein said matrix material is ceramic based.

21. The composite structure of claim 12 wherein said matrix material is polymeric based.

* * * * *